United States Patent Office 2,954,766
Patented Oct. 4, 1960

2,954,766
PROCESS FOR MAKING ORTHOPEDIC CAST
Andrew John Foglia, Danbury, Conn., assignor to American Cyanamid Company, New York, N.Y., a corporation of Maine
No Drawing. Filed Mar. 23, 1955, Ser. No. 496,348
3 Claims. (Cl. 128—91)

This invention relates to material for an orthopedic cast and process of making the same.

In recent years an improved orthopedic cast has been prepared by applying a mixture of plaster of Paris, finely ground water soluble thermosetting resin particularly aminoplasts of the melamine formaldehyde type and a binder which results in adhesion to the gauze so that when the latter is rolled up in the form of a bandage excessive dusting does not take place and when wet, loss of coating is minimized. The mixture also contains a catalyst and when the material is wet with water by the surgeon and applied to the patient, for example in the case of fracture, a cast of improved strength and lightness is obtained, the melamine formaldehyde resin reinforcing the plaster of Paris and producing a strong, light, relatively quick setting and water resistant cast which after use can be removed in the usual way.

Material for orthopedic casts in which the melamine formaldehyde resin is water dispersible and fusible having a mol ratio of melamine to formaldehyde between about 1:1.5 to 1:3.3 and amounting to about from 5 to 30% of the total solids together with a binder such as polyvinyl acetate is described and claimed in the copending application of Foglia, Smith and Detwiler, Serial No. 349,094, filed April 5, 1953, now Patent Number 2,842,120, July 8, 1958.

The material for an orthopedic cast described and claimed in the above referred to application constitutes a greatly improved material and has achieved widespread use by surgeons in hospitals throughout the United States. However, the process of preparing the material and its composition result in certain procedural disadvantages. Since it is desirable to incorporate the catalyst for the setting of plaster of Paris and also for the curing of the resin in the material to be used for the cast, it was necessary to apply the binder in a suitable solvent which was substantially anhydrous such as a solvent mixture containing an alkyl ether of a glycol. The solvent then had to be removed or in the case of an aqueous slurry the combination of water and solvent and this was costly. Not only did the removal of the relatively large amounts of liquid require time and large drying equipment but the high temperature necessary produced a considerable fire hazard.

The present invention eliminates any need for large quantities of solvents, by fusing or softening the resin and binder by means of heat. As a result, no drying at all is needed or a low capacity drying oven may be employed if there is any residual water in the formation of the slurry of material which is to be applied to the gauze backing.

It is an advantage of the present invention that the elimination of the severe drying problem is achieved without materially changing the nature or proportion of the materials used. Thus, for example the choice of melamine formaldehyde resin remains the same, that is to say, a fusible resin with a mol ratio of melamine formaldehyde between 1:1.5 and 1:1.33 and preferably between 1:1.7 and 1:2.5. The amount of the resin employed is also not changed, varying from 5 to 30% of total solids. Similarly the binder can be present in very small amounts as in the Smith et al. application referred to above. Thus, for example, amounts of binder between 0.5 and 3% may be employed. It is also an advantage of the invention that the softening of the resin itself causes the resin to act as a temporary binder and so may take over part or all of the functions of a separate binder. Although it is possible to eliminate the binder entirely it is preferable to use some binder which may be of the same type as described in the Smith et al. application above referred to, namely such materials as polymethacrylates, polyethacrylates, and the like, polyvinyl acetate, chloride, acetals, formals, etc. or even such materials as rubber latex and latices of synthetic elastomers. A very satisfactory binder is polyvinyl acetate and this is preferred.

The invention will be described in greater detail in conjunction with the following specific examples in which the parts are by weight unless otherwise specified.

Example 1

Twenty-five parts of a high density 2-minute setting time plaster of Paris; 5.7 parts of trimethylol melamine, 0.5 part of ammonium sulfate and 0.28 part of polyvinyl acetate are thoroughly mixed in finely divided form and are thinly and uniformly applied with a small amount of a solvent such as toluene on to gauze. The gauze passes over a platform and then through heated rollers which soften the resin and polyvinyl acetate to the point where they act as binding agents to keep the solids on the gauze during storage. The amount of material added to the gauze is sufficient to give about 125 lbs. of solids per 1000 sq. ft. of gauze. The temperature of the rolls is not critical but the temperature of the fused or partly fused resin and binder should not exceed about 250–260° F. and can advantageously be maintained at about 200° F. The amount of toluene present is that which will permit sufficient fusion or softening at the temperature chosen. The roll of gauze is then slit into narrower widths and rolled in the form of a bandage roll in which form it is useful for forming an orthopedic cast after soaking in water.

Example 2

Ninety parts of a 2-minute high density plaster of Paris and 10 parts of a melamine formaldehyde resin are in mol ratio of 1:2 melamine to formaldehyde, 0.6 part boric acid, 0.4 part concentrated ammonium hydroxide and 1 part of polyvinyl acetate are dry blended and applied to the gauze together with about 1% of finely divided light silica to produce a softer feel cast. Product obtained is the same as in Example 1.

Example 3

The procedure of the preceding examples is repeated using 150 parts of 2-minute low consistency plaster of Paris and 26 parts of the melamine formaldehyde resin of Example 2. The application is such as to give 125–140 lbs. of solids per 1000 sq. ft. of gauze. An excellent product is obtained.

Example 4

The procedure of Example 3 is repeated but using 0.4 part of potassium sulfate, and 1.06 part of potassium chloride to 1 part of ammonium sulfate in place of the catalysts used in the preceding examples. An excellent product is obtained which on soaking and forming into an orthopedic cast sets to give a strong, light cast of satisfactory properties.

I claim:
1. A process for making material for an orthopedic cast which comprises a finely divided mixture of an uncured melamine formaldehyde resin and plaster of Paris, on a gauze backing which comprises: applying a finely divided mixture of dry ingredients in the form of substantially anhydrous solids and in the absence of a liquid phase to a gauze bandage, subjecting the bandage to momentary heat and pressure, the temperature not appreciably exceeding 260° F. but sufficient to soften the resin and cause it to bind the particles of plaster of Paris to the gauze, the melamine resin being a fusible, water dispersible resin having a mol ratio of from 1:1.5 to 1:3.3 melamine to formaldehyde respectively and the resin constituting from 5 to 30% of the solids content, a catalyst for the resin, and from 0.5 to 3% by weight of total solids of an adhesive binding agent, being present in said dry ingredients, the remainder of said dry ingredients being plaster of Paris.

2. A process according to claim 1 in which the resin is present in an amount from 10–20% of the total solids.

3. A process according to claim 1 in which the melamine resin has a mol ratio of from 1:1.7 to 1:2.5 melamine to formaldehyde and the adhesive binding agent is polyvinyl acetate.

References Cited in the file of this patent

UNITED STATES PATENTS

| 2,571,343 | Dailey | Oct. 16, 1951 |
| 2,655,148 | Eberl | Oct. 13, 1953 |
| 2,842,120 | Foglia | July 8, 1958 |

FOREIGN PATENTS

| 167,596 | Australia | June 17, 1954 |
| 200,924 | Australia | Dec. 1, 1954 |
| 1,001,813 | France | Oct. 24, 1957 |